United States Patent [19]
Yamano et al.

[11] Patent Number: 5,163,157
[45] Date of Patent: Nov. 10, 1992

[54] PIPELINE COMPUTER WITH BYPASS ROUTE FOR RETURNING DATA TO REQUEST SOURCE

[75] Inventors: Kozo Yamano, Tokyo; Norihito Nakagomi, Yamanashi, both of Japan

[73] Assignee: NEC Corporation, Tokyo, Japan

[21] Appl. No.: 501,905

[22] Filed: Mar. 30, 1990

[30] Foreign Application Priority Data

Mar. 30, 1989 [JP] Japan .................................. 1-80043

[51] Int. Cl.$^5$ ............................................. G06F 9/38
[52] U.S. Cl. .................................. 395/800; 395/425; 364/DIG. 1; 364/231.8; 364/259.2; 364/239.4
[58] Field of Search ... 364/200 MS File, 900 MS File; 395/400, 425, 800

[56] References Cited

U.S. PATENT DOCUMENTS

| | | | |
|---|---|---|---|
| 4,398,245 | 8/1983 | Fujita | 364/200 |
| 4,561,052 | 12/1985 | Tateno | 364/200 |
| 4,695,943 | 9/1987 | Keeley et al. | 364/200 |
| 4,794,518 | 12/1988 | Mizushima | 364/200 |
| 4,916,652 | 4/1990 | Schwarz et al. | 364/200 |

*Primary Examiner*—Thomas M. Heckler
*Attorney, Agent, or Firm*—Sughrue, Mion, Zinn, Macpeak & Seas

[57] ABSTRACT

In a pipeline computer, a store sub-instruction address is stored into a most recent address register as well as into an address buffer in response to a store request and a load sub-instruction address is supplied to a main memory in response to a load sub-instruction. When a store sub-instruction data is stored into a buffer following the storage of the store sub-instruction address into the most recent address register, the contents of the address buffer and the data buffer are transferred to a location of the main memory specified by the sub-instruction address. Main memory data is retrieved from a location specified by an associated load sub-instruction address. A match or a mismatch is detected between the address in the most recent address register and an address generated in response to a subsequent load sub-instruction. If the latter occurs just prior to the storage of store sub-instruction data into the data buffer and if it accesses the same data as the store sub-instruction data, a match will be detected and data from an arithmetic logic unit is stored into a replay data register and returned to the request source. If a mismatch is detected and data read out of the main memory is passed through the reply data register to the request source.

9 Claims, 3 Drawing Sheets

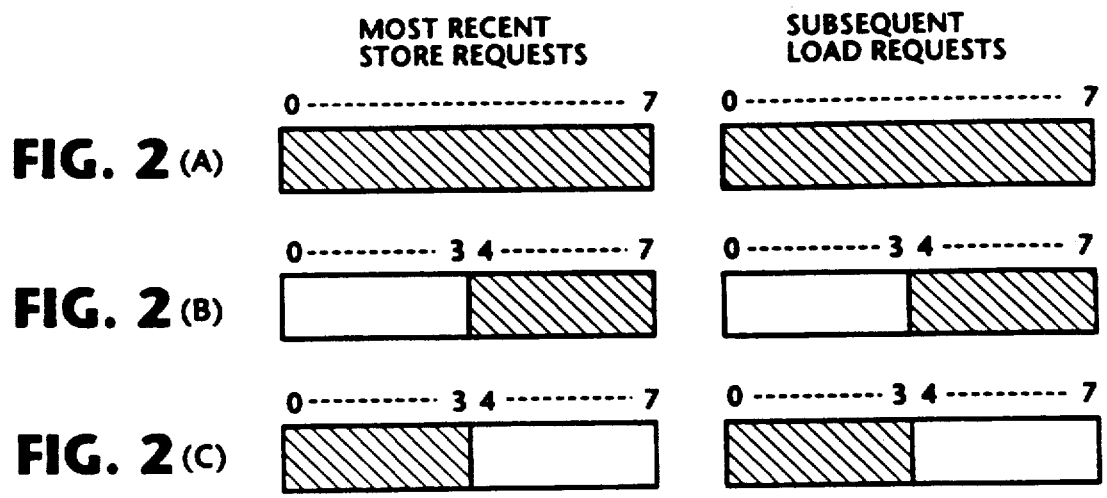
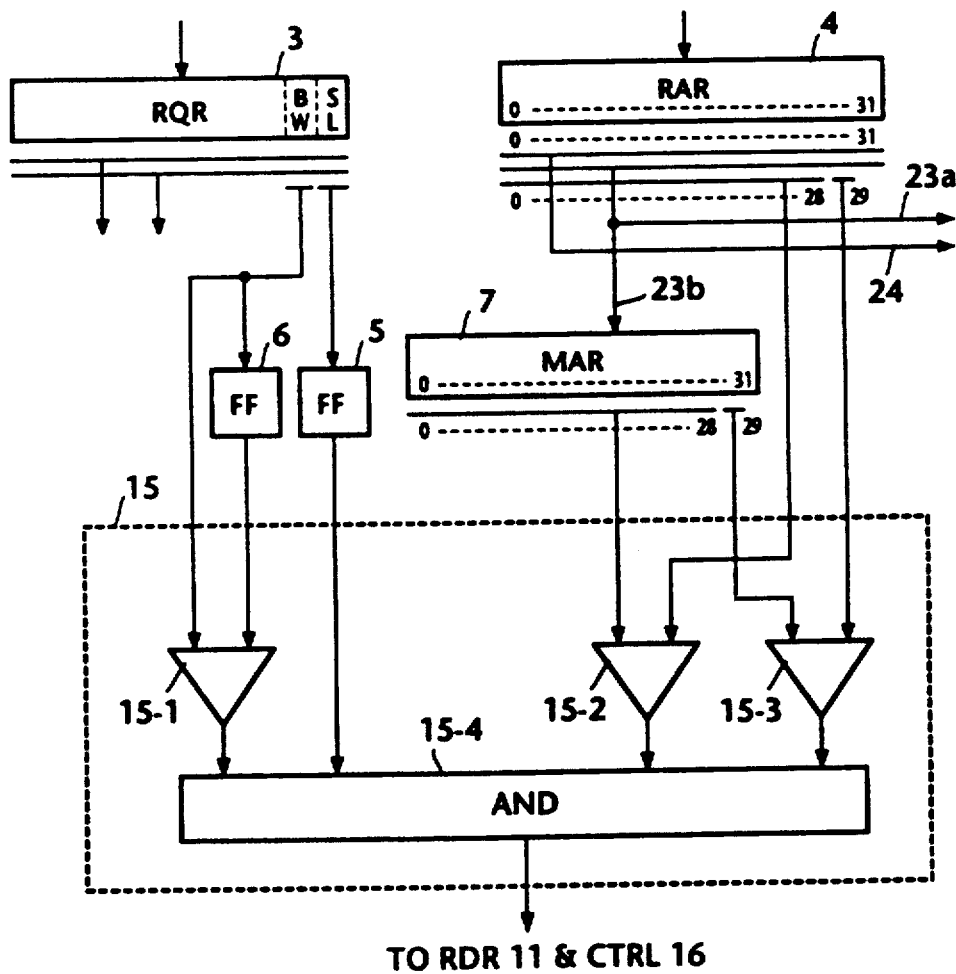

PIPELINE COMPUTER WITH BYPASS ROUTE FOR RETURNING DATA TO REQUEST SOURCE

BACKGROUND OF THE INVENTION

The present invention relates generally to pipeline computers having store buffers for temporary storage of a store request, and more particularly to a technique for reducing the waiting time of a load request that occurs immediately following a store request for transaction data from an arithmetic logic unit.

In pipeline computers, each execution instruction is divided into sub-instructions which are executed serially with those of another instruction in order to reduce execution time. In a pipeline computer, a set of buffers known as "store" buffers are used in addition to cache memories as a means for temporary storage of address and transaction data associated with a "store" request, or sub-instruction before storing it into the main memory. The information stored in the main memory is then retrieved in response to a "load" request (sub-instruction) into the internal storage of the computer such as buffers and registers. The reasons for the provision of store buffers are (1) to accommodate timing differences between store request address and store request transaction data and (2) to put "store" requests in a queue when a conflict arises with a higher priority "load" request until the latter is executed except when a need aries for transaction data associated with a store sub-instruction of which the subsequent load sub-instruction is not yet executed otherwise the prior execution of a later load sub-instruction will cause old transaction data to be returned to the request source. Under such circumstances, all unexecuted store sub-instructions in store buffers are stored into the main memory first and then the subsequent load sub-instruction is executed. In this way, data conflicts between different instructions are avoided. Since a substantial amount of time is required to execute all of the pending "store sub-instructions" and then execute a subsequent load sub-instruction, the request source must wait in a long queue for desired data.

SUMMARY OF THE INVENTION

It is therefore an object of the present invention to provide a pipeline computer capable of quickly returning data to a load request source without data conflicts when a conflict arises between an earlier store sub-instruction and a later load sub-instruction.

According to the present invention, there is provided a pipeline computer having an arithmetic logic unit, a main memory and a sub-instruction, or request source, for generating an address and concurrently issuing a store sub-instruction for storing data into a location of the main memory specified by the address or a load sub-instruction for retrieving data from a location of the main memory specified by the address. The pipeline computer of the invention has a data buffer for storing data from the arithmetic logic unit, an address buffer, a most recent address register, a request register for storing an address from the request source into the address buffer means and into the most recent address register means as a most recent address when a store sub-instruction is issued from the request source and sending an address from the request source to the main memory when a load sub-instruction is issued therefrom. A coincidence detector is provided for detecting a match between the most recent address and an address generated by the request source when a load sub-instruction is subsequently issued therefrom. When data is stored into the data buffer from the arithmetic logic unit, the contents of the address buffer and the data buffer are transferred to the main memory. In this way, the data stored in the data buffer is transferred to a location of the main memory specified by the address stored in the address buffer if the address is associated with a store sub-instruction and data is read from a location of the main memory specified by the address stored in the address register if it is associated with a load sub-instruction. A reply data register is provided for receiving data read out of the main memory in response to a load sub-instruction when no match is detected by the coincidence detector and receiving data from the arithmetic logic unit when a match is detected by the coincidence detector. The output of the reply data register is connected to the request source for supplying the received data thereto. In the event that a subsequent load sub-instruction occurs just prior to the storage of data of a previous store sub-instruction and accesses the same data as that of this previous store sub-instruction, a match is detected by the coincidence detector and the reply data register returns data received from the arithmetic logic unit to the request source. As a result, the request source is not required to place itself in a long queue waiting for desired data.

BRIEF DESCRIPTION OF THE DRAWINGS

The present invention will be described in further detail with reference to the accompanying drawings, in which:

FIG. 2 shows several patterns of transaction data which satisfy the conditions set by the coincidence detector when a bit-by-bit match is detected;

FIG. 3 shows details of the coincidence detector of FIG. 1; and

DETAILED DESCRIPTION

Figure 1:
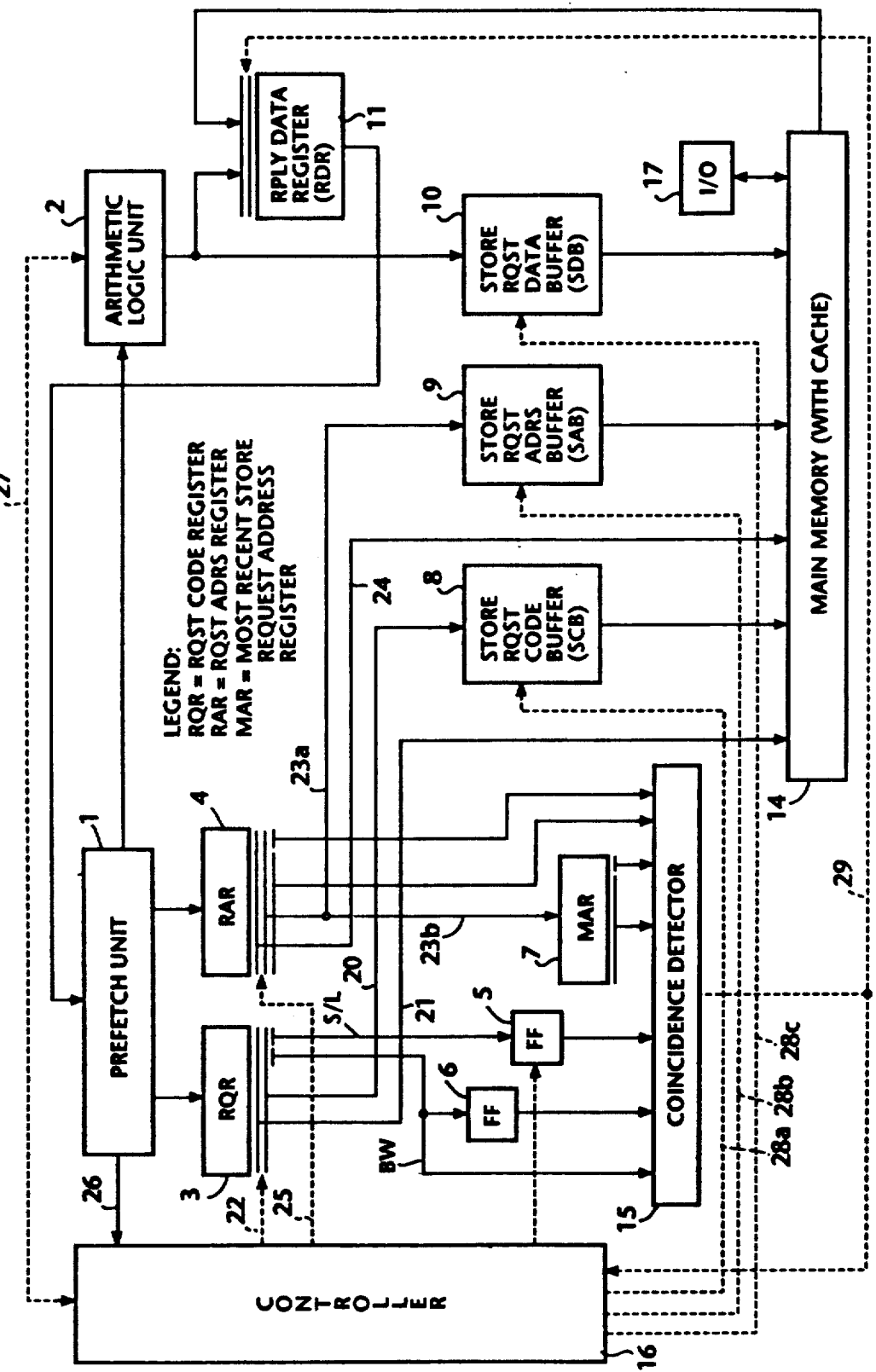
FIG. 1 is a block diagram of a pipeline computer of the present invention.

In FIG. 1, the pipeline computer of this invention has a prefetch unit 1 which is connected to a main memory 14 to decode instructions received from it. The prefetch unit 1 also generates a "store" request or sub-instruction and a "load" request or sub-instruction and supplies transaction data to an arithmetic log unit (ALU) 2 for execution. Transaction data is then supplied from ALU 2 to a store request data buffer (SDB) 10 and to a first input of a reply data register (RDR) 11 in response to a "computer" sub-instruction from prefetch unit 1 which is generated concurrently with a "store" request. RDR 11 has a second input into which data stored in main memory 14 is laded in response to a load request generated by prefetch unit 1. As will be described later, RDR 11 serves as a bypass register to selectively couple data on its first or second input to the prefetch unit 1 in dependence on a signal supplied on a line 29 from a coincidence detector 15.

A request code register (RQR) 3 and a request address register (RAR) 4 are connected to the prefetch unit 1 to receive store and load requests. The information stored in RQR 3 is called a "request code" which contains information relating to the type of memory access, bit-width indicating bit (BW) and a store/load indicating bit (S/L), and so forth. The information stored in RAR 4 is the address of a location of the main memory 14 into which the transaction data associated with a store request is to be stored or a location of memory 14 in which the data to be fetched is stored. An I/O device 17 is connected to main memory 14.

RQR 3 has two outputs ports which are selectively connected on a bus 20 to a store request code buffer (SCB) 8 or on a bus 21 to a main memory 14 in response to a control signal supplied on a line 22 from a controller 16. RAR 4 has a likewise two output ports which are selectively connected on a bus 23a to a store request address buffer (SAB) 9 and on a bus 23b to a most recent store request address register 7, or on a bus 24 to the main memory 14 in response to a control signal supplied on a line 25 from the controller 16. More specifically, controller 16 responds to a signal supplied on a bus 26 from prefetch unit 1 by coupling the contents of register 3 to buffer 8 and the contents of register 4 to "store" buffer 9 and MAR 7 when a store sub-instruction is issued to registers 3 and 4, and coupling the contents of register 3 and 4 to main memory 14 when a load sub-instruction is issued. Each of the buffers 8, 9 and 10 is of a first-in-first-out (FIFO) type of memory device having a series of entries or cells the storing respective information associated with a sub-instruction.

Flip-flops 5 and 6 are respectively connected to the store/load indicating bit (S/L) and the bit-width indicating bit (B/W) of RQR 3. When the S/L bit is at logic 1, flip-flop 5 is set to logic 1, indicating that a store sub-instruction is issued from the prefetch unit 1 to supply an enable pulse to coincidence detector 15. When a load sub-instruction is to be issued, the S/L bit is reset to 0. The bit-width indicating bit (B/W) is 1 when transaction data associated with a sub-instruction is of a 4-byte width and is 0 when the data is of an 8-byte width.

Coincidence detector 15 receives inputs from the B/W bit of RQR 3, the outputs of flip-flop 6 and MAR 7, and the outputs of RAR 4. In response to receipt of an enable pulse from flip-flop 5, coincidence detector 15 determines whether there is a bit-by-bit match or a mismatch between the input and output of flip-flop 6 and between the inputs and outputs of MAR 7. The output of coincidence detector 15 is connected to controller 16 and to RDR 11. The function of the output of coincidence detector 15 to RDR 11 is to causes its input transaction data from ALU 2 to be returned direct to prefetch unit 1, bypassing the main memory when a bit-by-bit match is detected by coincidence detector 15.

As shown in FIG. 2, several patterns of transaction data generated by ALU 2 in response to a most recent store sub-instruction and a subsequent load sub-instruction are illustrated. Transaction data generated by ALU 2 in response to each sub-instruction may either be of 8-byte length as shown in part (A) of FIG. 2, or of a 4-byte length of data occupying a second half of an 8-byte field as shwon in part (B) of FIG. 2, or of a 4-byte length of data occupying a first half of the 8-byte field as shown in part (C) of FIG. 2. If the transaction data of a most recent store sub-instruction matches bit-by-bit with the transaction data of a subsequent load sub-instruction, coincidence detector 15 supplies a switching control signal to controller 16 on the one hand and a line 29, on the other hand, to RDR 11 to cause it to switch its input to accept data supplied from ALU 2. If no coincidence occurs, the input of RDR 11 is connected to the output of memory 14 to wait for data supplied therefrom in a conventional manner.

Coincidence detector 15 is shown in detail in FIG. 3 as comprising comparators 15-1, 15-2 and 15-3, and an AND gate 15-4. A bit-width bit from RQR 3 that is stored in flip-flop 6 in response to a most recent store sub-instruction is compared by comparator 15-1 with a bit-width output bit from RQR 3 that is generated in response to a subsequent load sub-instruction concurrently with a logic 1 stored in flip-flop 5. If the compared bit-width indicating bits are identical to each other, comparator 15-1 switches its output to AND gate 15-4 gate 15-4 to logic 1. RAR 4 is shown as comprising a 32-bit register with the 0-th to 28-th bits being used to indicate the boundary of transaction data, or address of an 8-byte storage cell of the memory 15 in which that data is to be stored or from which it is to be retrieved. The 29-th bit of RAR 4 is 1 for indicating that 4-byte data is to be stored into or retrieved from a second half of an 8-byte cell and 0 for indicating that 4-byte data is to be stored into or retrieved from a first half of an 8-byte cell. All 32-bit data of RAR 4 are supplied selectively to SAB 9 and MAR 7 or directly to main memory 14 and the 0-th to the 28-th bits of RAR 4 are supplied to comparator 15-2 and the 29-th bit is supplied to comparator 15-3. MAR 7 has 0-th to 28-th bits connected to comparator 15-2 for detecting a bit-by-bit match with the 0-th to 28-th bits of RAR 4 which are generated in response to a subsequent load sub-instruction. When this occur, a logic 1 output is supplied from comparator 15-2 to AND gate 15-4. Likewise, the 29-th bit of MAR 7 is supplied to comparator 15-3 for comparison with the 29-th bit of RAR 4 which is generated in response to the subsequent load sub-instruction to supply a logic 1 to AND gate 15-4 when coincidence occurs between them. The output of flip-flop 5 is supplied to AND gate 15-4. If a logic 1 is stored in flip-flop 5 and the outputs of all comparators are at logic 1, the output of AND gate 15-4 goes high, producing a coincidence output for application to RDR 11 and controller 16.

Figure 4:
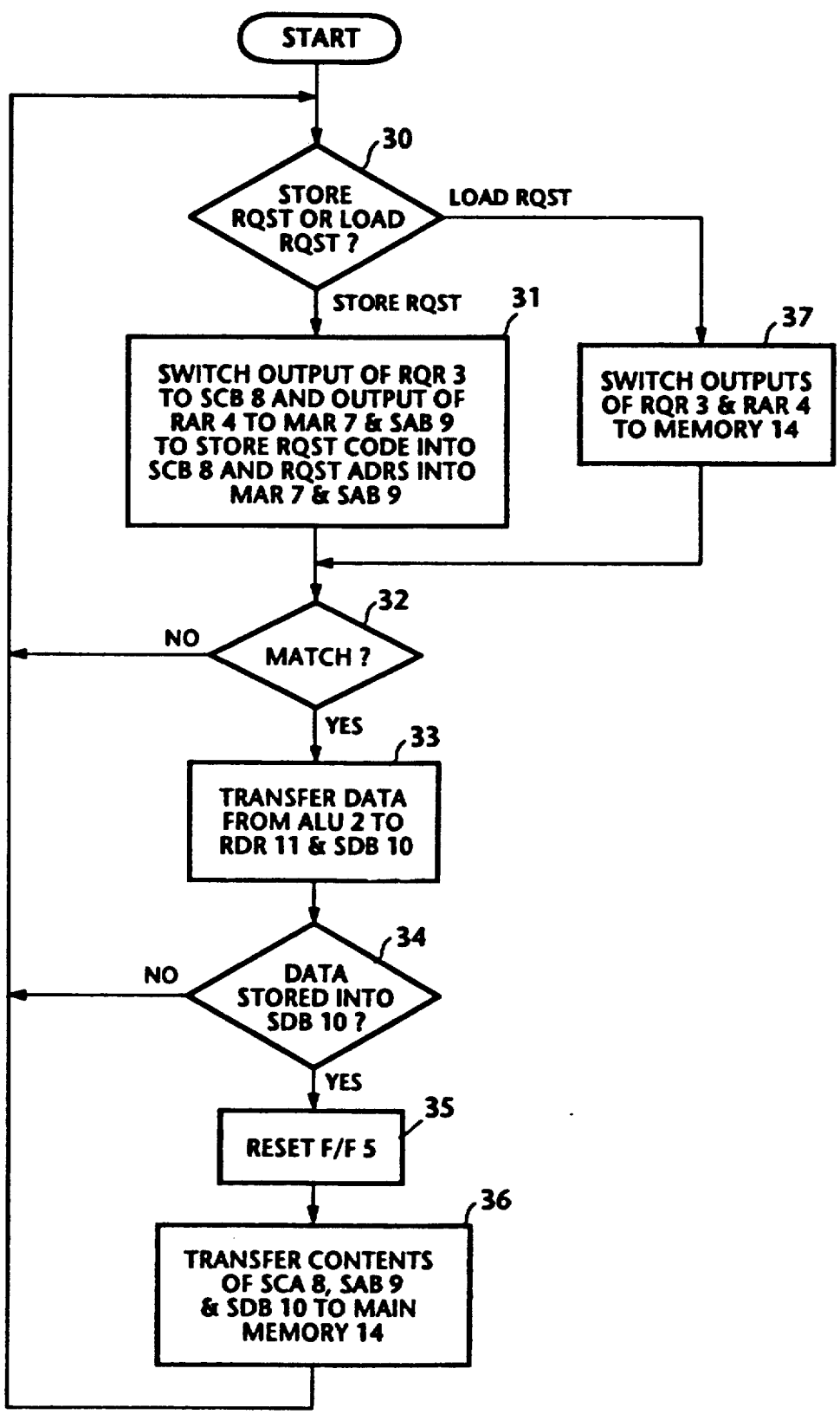
FIG. 4 is a flowchart describing instructions to be performed by the controller of FIG. 1.

The operation of the controller 16 will be better understood with reference to a flowchart shown in FIG. 4. A program execution starts with step 30 in which the controller 16 checks to see if a signal supplied from prefetch unit 1 is indicative of a store sub-instruction or a load sub-instruction. If the signal is identified as a store sub-instruction, control moves to step 31 to switch the output of RQR 3 to SCB 8 and switch the output of RAR 4 to MAR 7 and to SAB 9, so that a "store" sub-instruction code is stored into SCB 8 and a "store" sub-instruction address is stored in MAR 7 and SAB 9. Exit then is to decision step 32 which checks to see if there is a match detected by coincidence detector 15. If there is no match, control returns to step 30 and no switching control signal is supplied to RDR 11 to allow its input to be connected to the output of memory 14, allowing RDR 11 to wait for data from main memory 14. If the answer is affirmative, a control signal is applied from coincidence detector 15 to RDR 11 to switch its input to the output of ALU 2, and the controller 16 advances to step 33 to direct ALU 2 through bus 27 to transfer transaction data to SDB 10 and RDR 11 to which the switching control signal is applied from coincidence detector 15. Therefore, if the same data is needed by a subsequent load sub-instruction, it is returned through a bypass route formed by RDR 11 to the request source 1.

Exit then is to decision step 34 in which controller 16 checks a signal from ALU 2 on bus 27 to see if transaction data associated with the most recent store sub-instruction has been transferred from ALU 2 to SDB 10. If the answer is negative, control returns to step 31. If the data now stored into SDB 9 is one that is associated with the most recent "store" sub-instruction, the decision in step 33 is affirmative, and the exit is to step 35 to reset flip-flop 5 to logic 0. Control now moves ahead to step 36 to supply controls signals on lines 28a, 28b and 28c to SCA 8, SAB 9 and SDB 10 to cause them to transfer their contents to main memory 14. Control now returns to step 30 to repeat the process.

If the decision in step 30 indicates that a load sub-instruction is issued from prefetch unit 1, control exits to step 37 to switch the outputs of RQR 3 and RAR 4 to the main memory 14. Exit from step 37 is to step 32 to check for the detection of a match by coincidence detector 15.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A pipeline computer having an arithmetic logic unit, a main memory and a request source for generating an address and concurrently issuing a store sub-instruction for storing data into a location of said main memory specified by said address or a load sub-instruction for retrieving data form a location of said main memory specified by said address, comprising:

data buffer means for storing data from said arithmetic logic unit;

address buffer means;

most recent address register means;

request register means for storing an address from said request source into said address buffer means and into said most recent address register means as a most recent address when a store sub-instruction is issued form said request source and sending an address from said request source in said main memory when a load sub-instruction is issued therefrom;

coincidence detector means for detecting a match between said most recent address and an address generated by said request source when a load sub-instruction is subsequently issued therefrom.;

control means for detecting when data is stored into said data buffer means and causing contents of said address buffer means and said data buffer means to be transferred to said main memory; and reply data register means for receiving data read out of said main memory in response to said load sub-instruction when no match is detected by said coincidence detector means and receiving data from said arithmetic logic unit when a match is detected by said coincidence detector means, output of said reply data register means being connected to said request source for supplying the received data thereto.

2. A pipeline computer as claimed in claim 1, wherein said address generated by said request source contains a bit indicating whether data to be generated by said arithmetic logic unit is associated with a store sub-instruction or a load sub-instruction, and wherein said most recent address register means comprises flip-flop means for storing said bit, said coincidence detector means is enabled in response to said bit stored in said flip-flop means to effect the detection of said match.

3. A pipeline computer as claimed in claim 2, wherein data generated by said arithmetic logic unit is a mixture of wide bit-width data and narrow bit width data, and said address supplied from said request source contains a second bit indicating whether data associated with said store sub-instruction is wide bit-width data or narrow bit-width data, and wherein said most recent address register means includes second flip-flop means for storing said second bit, and wherein said coincidence detector means includes means for detecting a coincidence between said second bit stored in said second flip-flop means with a second bit generated subsequently by said request source.

4. A pipeline computer as claimed in claim 2, wherein said bit stored in said flip-flop means is cleared by said control means when data is stored into said data buffer means from said arithmetic logic means.

5. A pipeline computer as claimed in claim 1, wherein each of said data buffer means and said address buffer means comprises a first-in-first-out buffer having a plurality of storage cells.

6. A method for controlling a pipeline computer having an arithmetic logic unit, a main memory and a request source for generating an address and concurrently issuing a store sub-instruction for storing data into a location of said main memory specified by said address or a load sub-instruction for retrieving data from a location of said main memory specified by said address, comprising the steps of:

a) storing an address from said request source into an address buffer means and into a most recent address register means as a most recent address when a store sub-instruction is issued from said request source and sending an address from said request source to said main memory when a load sub-instruction is issued therefrom;

b) detecting a match between said most recent address and an address generated by said request source when a load sub-instruction is subsequently issued therefrom;

c) detecting when data is stored into said data buffer means and causing contents of said address buffer means and said data buffer means to be transferred to said main memory, thereby storing data in said data buffer means into a location of said main memory specified by an address stored in said address buffer means if the address is associated with a store sub-instruction and reading data from a location of said main memory specified by an address stored in said address register means if the address is associated with a load sub-instruction; and d) storing data read out of said main memory into a reply data register means when no match is detected by the step (b) and storing data from said arithmetic logic unit into said reply data register means when a match is detected by the step (b) and supplying the data stored in said replay data register means to said request source.

7. A pipeline computer as claimed in claim 6, wherein said address generated by said request source contains a bit indicating whether data to be generated by said arithmetic logic unit is associated with a store sub-instruction or a load sub-instruction, and wherein the step (a) comprises storing said bit in a flip-flop and the step (c) comprises effecting the detection of said match in response to said bit stored in said flip-flop.

8. A pipeline computer as claimed in claim 7, wherein data generated by said arithmetic logic unit is a mixture of wide bit-width data and narrow bit width data, and said address supplied from said request source contains a second bit indicating whether data associated with said store sub-instruction is wide bit-width data or narrow bit-width data, and wherein the step (a) further comprises storing said second bit in a second flip-flop, and wherein the step (c) comprises detecting a coincidence between said second bit stored in said second flip-flop with a second bit generated subsequently by said request source.

9. A pipeline computer as claimed in claim 6, wherein the step (c) comprises clearing said flip-flop when data is stored into said data buffer means from said arithmetic logic means.

* * * * *

UNITED STATES PATENT AND TRADEMARK OFFICE
CERTIFICATE OF CORRECTION

PATENT NO. : 5,163,157

DATED : November 10, 1992

INVENTOR(S) : Kozo YAMANO et al.

Page 1 of 2

It is certified that error appears in the above-identified patent and that said Letters Patent is hereby corrected as shown below:

ON THE TITLE PAGE

Abstract, line 6, before "buffer", insert --data--;

Abstract, line 20, delete "replay", insert --reply--;

Col. 1, line 28, delete "aries", insert --arises--;

Col. 2, line 57, delete "laded", insert --loaded--;

Col. 3, line 25, after "calls", insert --for--;

Col. 3, line 59, delete "shwon", insert --shown--;

Col. 4, line 13, delete "gate 15-4";

Col. 4, line 16, delete "15", insert --14--;

Col. 4, line 30, delete "occur", insert --occurs--;

Col. 6, line 63, delete "A pipeline computer", insert --A method--;

Col. 7, line 3, delete "A pipeline computer", insert --A method--;

UNITED STATES PATENT AND TRADEMARK OFFICE
CERTIFICATE OF CORRECTION

PATENT NO.  : 5,163,157

DATED       : November 10, 1992

INVENTOR(S) : Kozo YAMANO et al

It is certified that error appears in the above-indentified patent and that said Letters Patent is hereby corrected as shown below:

Col. 8, line 5, delete "A pipeline computer", insert --A method--.

Signed and Sealed this

Twenty-fifth Day of January, 1994

Attest:

BRUCE LEHMAN

*Attesting Officer*    *Commissioner of Patents and Trademarks*